(12) United States Patent
Murray

(10) Patent No.: US 7,454,419 B2
(45) Date of Patent: *Nov. 18, 2008

(54) LIST UPDATE EMPLOYING NEUTRAL SORT KEYS

(75) Inventor: Douglas G. Murray, Johnson City, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/867,753

(22) Filed: Oct. 5, 2007

(65) Prior Publication Data

US 2008/0027964 A1    Jan. 31, 2008

Related U.S. Application Data

(63) Continuation of application No. 11/106,287, filed on Apr. 14, 2005, now Pat. No. 7,293,022.

(51) Int. Cl.
  *G06F 17/30* (2006.01)
(52) U.S. Cl. .............................. 707/6; 707/7; 707/101
(58) Field of Classification Search .................. None
  See application file for complete search history.

(56) References Cited

U.S. PATENT DOCUMENTS

| | | | |
|---|---|---|---|
| 5,710,899 A | | 1/1998 | Eick |
| 5,737,594 A | | 4/1998 | Williams |
| 5,745,896 A | | 4/1998 | Vijaykumar |
| 5,806,057 A | | 9/1998 | Gormley et al. |
| 5,832,497 A | * | 11/1998 | Taylor ..................... 707/104.1 |
| 5,852,822 A | * | 12/1998 | Srinivasan et al. ............. 707/4 |
| 5,870,746 A | * | 2/1999 | Knutson et al. ............. 707/101 |
| 5,978,788 A | | 11/1999 | Castelli et al. |
| 6,078,924 A | | 6/2000 | Ainsbury et al. |
| 6,115,710 A | | 9/2000 | White |
| 6,424,969 B1 | | 7/2002 | Gruenwald |
| 6,687,688 B1 | | 2/2004 | Fujihara et al. |
| 6,701,313 B1 | * | 3/2004 | Smith ........................... 707/6 |

(Continued)

OTHER PUBLICATIONS

Goetz Graefe; Implementing Sorting in Database Systems; ACM Computing Surveys, vol. 38, No. 3, Article 10, Publication date: Sep. 2006; pp. 1-37.

(Continued)

*Primary Examiner*—Neveen Abel-Jalil
*Assistant Examiner*—Jacques Veillard
(74) *Attorney, Agent, or Firm*—Schmeiser, Olsen & Watts; William E. Schiesser

(57) ABSTRACT

A method for updating a list. A first list associated with a first platform includes a first plurality and a second plurality of keys. A second list associated with a second platform includes a third plurality of keys. The first and second platforms sort a first subset of characters differently. The second plurality and third plurality of keys are formed from a second subset of n characters sorted identically on the first and second platforms. An initial key in the first plurality of keys is converted to a neutral key to be included in the second plurality of keys by converting a character in the initial key to a number represented in a number system having a base b where n≥b. After the first list is updated, the lists are sorted and compared, and the second list is updated.

10 Claims, 7 Drawing Sheets

U.S. PATENT DOCUMENTS

| | | | |
|---|---|---|---|
| 6,704,737 B1 | 3/2004 | Nixon et al. | |
| 6,947,931 B1 * | 9/2005 | Bass et al. | 707/6 |
| 6,959,303 B2 | 10/2005 | Rajasekaran et al. | |
| 7,165,060 B2 * | 1/2007 | Foster et al. | 707/2 |
| 7,197,498 B2 | 3/2007 | Perloff | |
| 7,293,022 B2 * | 11/2007 | Murray | 707/7 |

OTHER PUBLICATIONS

Guibas et al.; A New Representation For Linear Lists; 1977; ACM Press; pp. 49-60.

Klier et al.; On Finding the Closest Bitwise Matches in a Fixed Set; ACM Transactions on Mathematical Software, vol. 17, No. 1; Mar. 1991; pp. 88-97.

Lee et al.; The Definition and Validation of the Radix Sorting Technique; 1972; ACM Press; pp. 142-149.

Das et al.; Multi-Mesh—An Efficient Topology for Parallel Processing; 1995 IEEE; pp. 17-21; Electronics Unit, Indian Statistical Institute, Calcutta—700 035, India.

Morgado et al.; Adding Value to Key Issues Research Through Q-Sorts and Interpretive Structured Modeling; Communications of the Association for Information Systems, vol. 1, Article 3; Jan. 1999; pp. 1-24.

Das et al.; A New Network Topology with Multiple Meshes; 1999 IEEE Transactions on Computers, vol. 48, No. 5; May 1999; pp. 536-551.

* cited by examiner

| Master List | | |
|---|---|---|
| Neutral key | Serial No. | Country Code |
| DADBDIDFDHDBDGDEDJ | 018571 | 649 |
| DADCDBDJDHDEDGDEDJ | 021974 | 649 |
| DADCDEDFDFDCDGDEDJ | 024552 | 649 |
| DADCDGDJDGDJDGDEDJ | 026969 | 649 |
| EDCNDADHEEFCEDEBDD | C-07DR | CA3 |
| EDCNDADHFCFCEDEBDD | C-07RR | CA3 |
| EDCNDADIFCFCEDEBDD | C-08RR | CA3 |
| EDCNDADJFCFCEDEBDD | C-09RR | CA3 |
| EDCNDAEDFCFCEDEBDD | C-0CRR | CA3 |
| EDCNDAEEEOENEDEBDD | C-0DNM | CA3 |
| EDCNDAEEFCFCEDEBDD | C-0DRR | CA3 |
| EDCNDAEHDBFBEDEBDD | C-0G1Q | CA3 |
| EDCNDAEHFCEEEDEBDD | C-0GRD | CA3 |
| EDCNDAEKFHENEDEBDD | C-0JWM | CA3 |
| EDCNDAENDCFBEDEBDD | C-0M2Q | CA3 |
| EDCNDAENDJFDEDEBDD | C-0M9S | CA3 |
| EDCNDAEOFEFAEDEBDD | C-0NTP | CA3 |
| EDCNDAFAEMELEDEBDD | C-0PLK | CA3 |
| EDCNDAFBFBFBEDEBDD | C-0QQQ | CA3 |
| EDCNDAFCFBFBEDEBDD | C-0RQQ | CA3 |
| EDCNDAFEDJFBEDEBDD | C-0T9Q | CA3 |

| Secondary List | | |
|---|---|---|
| Neutral key | Serial No. | Country Code |
| DADBDIDFDHDBDGDEDJ | 018571 | 649 |
| DADCDBDJDHDEDGDEDJ | 021974 | 649 |
| DADCDEDFDFDCDGDEDJ | 024552 | 649 |
| DADCDGDJDGDJDGDEDJ | 026969 | 649 |
| EDCNDADHEEFCEDEBDD | C-07DR | CA3 |
| EDCNDADHFCFCEDEBDD | C-07RR | CA3 |
| EDCNDADIFCFCEDEBDD | C-08RR | CA3 |
| EDCNDADJFCFCEDEBDD | C-09RR | CA3 |
| EDCNDAEDFCFCEDEBDD | C-0CRR | CA3 |
| EDCNDAEEEOENEDEBDD | C-0DNM | CA3 |
| EDCNDAEEFCFCEDEBDD | C-0DRR | CA3 |
| EDCNDAEHDBFBEDEBDD | C-0G1Q | CA3 |
| EDCNDAEHFCEEEDEBDD | C-0GRD | CA3 |
| EDCNDAEKFHENEDEBDD | C-0JWM | CA3 |
| EDCNDAENDCFBEDEBDD | C-0M2Q | CA3 |
| EDCNDAENDJFDEDEBDD | C-0M9S | CA3 |
| EDCNDAEOFEFAEDEBDD | C-0NTP | CA3 |
| EDCNDAFAEMELEDEBDD | C-0PLK | CA3 |
| EDCNDAFBFBFBEDEBDD | C-0QQQ | CA3 |
| EDCNDAFCFBFBEDEBDD | C-0RQQ | CA3 |
| EDCNDAFEDJFBEDEBDD | C-0T9Q | CA3 |

FIG. 3

| Master List | | |
|---|---|---|
| Neutral key | Serial No. | Country Code |
| DADBDIDFDHDBDGDEDJ | 018571 | 649 |
| DADCDBDJDHDEDGDEDJ | 021974 | 649 |
| DADCDEDFDFDCDGDEDJ | 024552 | 649 |
| DADCDGDJDGDJDGDEDJ | 026969 | 649 |
| EDCNDADHEEFCEDEBDD | C-07DR | CA3 |
| EDCNDADHFCFCEDEBDD | C-07RR | CA3 |
| EDCNDADIFCFCEDERDD | C-08RR | CA3 |
| EDCNDADJFCFCEDEBDD | C-09RR | CA3 |
| EDCNDAECFCFCEDEBDD | C-0BRR | CA3 |
| EDCNDAEDFCFCEDEBDD | C-0CRR | CA3 |
| EDCNDAEEOENEDEBDD | C-0DNM | CA3 |
| EDCNDAEEFCFCEDEBDD | C-0DRR | CA3 |
| EDCNDAEHDBFBEDEBDD | C-0G1Q | CA3 |
| EDCNDAEHFCEEEDEBDD | C-0GRD | CA3 |
| EDCNDAEKFHENEDEBDD | C-0JWM | CA3 |
| EDCNDAENDCFBEDEBDD | C-0M2Q | CA3 |
| EDCNDAENDJFDEDEBDD | C-0M9S | CA3 |
| EDCNDAEOFEFAEDEBDD | C-0NTP | CA3 |
| EDCNDAFAEMELEDEBDD | C-0PLK | CA3 |
| EDCNDAFBFBFBEDEBDD | C-0QQQ | CA3 |
| EDCNDAFCFBFBEDEBDD | C-0RQQ | CA3 |
| EDCNDAFEDJFBEDEBDD | C-0T9Q | CA3 |

| Secondary List | | |
|---|---|---|
| Neutral key | Serial No. | Country Code |
| DADBDIDFDHDBDGDEDJ | 018571 | 649 |
| DADCDBDJDHDEDGDEDJ | 021974 | 649 |
| DADCDEDFDFDCDGDEDJ | 024552 | 649 |
| DADCDGDJDGDJDGDEDJ | 026969 | 649 |
| EDCNDADHEEFCEDEBDD | C-07DR | CA3 |
| EDCNDADHFCFCEDEBDD | C-07RR | CA3 |
| EDCNDADIFCFCEDEBDD | C-08RR | CA3 |
| EDCNDADJFCFCEDEBDD | C-09RR | CA3 |
| EDCNDAEDFCFCEDEBDD | C-0CRR | CA3 |
| EDCNDAEEOENEDEBDD | C-0DNM | CA3 |
| EDCNDAEEFCFCEDEBDD | C-0DRR | CA3 |
| EDCNDAEHDBFBEDEBDD | C-0G1Q | CA3 |
| EDCNDAEHFCEEEDEBDD | C-0GRD | CA3 |
| EDCNDAEKFHENEDEBDD | C-0JWM | CA3 |
| EDCNDAENDCFBEDEBDD | C-0M2Q | CA3 |
| EDCNDAENDJFDEDEBDD | C-0M9S | CA3 |
| EDCNDAEOFEFAEDEBDD | C-0NTP | CA3 |
| EDCNDAFAEMELEDEBDD | C-0PLK | CA3 |
| EDCNDAFBFBFBEDEBDD | C-0QQQ | CA3 |
| EDCNDAFCFBFBEDEBDD | C-0RQQ | CA3 |
| EDCNDAFEDJFBEDEBDD | C-0T9Q | CA3 |

FIG. 6

| Master List | | |
|---|---|---|
| Neutral key | Serial No. | Country Code |
| DADBDIDFDHDBDGDEDJ | 018571 | 649 |
| DADCDBDJDHDEDGDEDJ | 021974 | 649 |
| DADCDEDFDFDCDGDEDJ | 024552 | 649 |
| DADCDGDJDGDJDGDEDJ | 026969 | 649 |
| EDCNDADHEEFCEDEBDD | C-07DR | CA3 |
| EDCNDADHFCFCEDEBDD | C-07RR | CA3 |
| EDCNDADIFCFCEDEBDD | C-08RR | CA3 |
| EDCNDADJFCFCEDEBDD | C-09RR | CA3 |
| EDCNDAECFCFCEDEBDD | C-0BRR | CA3 |
| EDCNDAEDFCFCEDEBDD | C-0CRR | CA3 |
| EDCNDAEEEOENEDEBDD | C-0DNM | CA3 |
| EDCNDAEEFCFCEDEBDD | C-0DRR | CA3 |
| EDCNDAEHDBFBEDEBDD | C-0G1Q | CA3 |
| EDCNDAEHFCEEEDEBDD | C-0GRD | CA3 |
| EDCNDAEKFHENEDEBDD | C-0JWM | CA3 |
| EDCNDAENDCFBEDEBDD | C-0M2Q | CA3 |
| EDCNDAENDJFDEDEBDD | C-0M9S | CA3 |
| EDCNDAEOFEFAEDEBDD | C-0NTP | CA3 |
| EDCNDAFAEMELEDEBDD | C-0PLK | CA3 |
| EDCNDAFBFBFBEDEBDD | C-0QQQ | CA3 |
| EDCNDAFCFBFBEDEBDD | C-0RQQ | CA3 |
| EDCNDAFEDJFBEDEBDD | C-0T9Q | CA3 |

| Secondary List | | |
|---|---|---|
| Neutral key | Serial No. | Country Code |
| DADBDIDFDHDBDGDEDJ | 018571 | 649 |
| DADCDBDJDHDEDGDEDJ | 021974 | 649 |
| DADCDEDFDFDCDGDEDJ | 024552 | 649 |
| DADCDGDJDGDJDGDEDJ | 026969 | 649 |
| EDCNDADHEEFCEDEBDD | C-07DR | CA3 |
| EDCNDADHFCFCEDEBDD | C-07RR | CA3 |
| EDCNDADIFCFCEDEBDD | C-08RR | CA3 |
| EDCNDADJFCFCEDEBDD | C-09RR | CA3 |
| EDCNDAECFCFCEDEBDD | C-0BRR | CA3 |
| EDCNDAEDFCFCEDEBDD | C-0CRR | CA3 |
| EDCNDAEEEOENEDEBDD | C-0DNM | CA3 |
| EDCNDAEEFCFCEDEBDD | C-0DRR | CA3 |
| EDCNDAEHDBFBEDEBDD | C-0G1Q | CA3 |
| EDCNDAEHFCEEEDEBDD | C-0GRD | CA3 |
| EDCNDAEKFHENEDEBDD | C-0JWM | CA3 |
| EDCNDAENDCFBEDEBDD | C-0M2Q | CA3 |
| EDCNDAENDJFDEDEBDD | C-0M9S | CA3 |
| EDCNDAEOFEFAEDEBDD | C-0NTP | CA3 |
| EDCNDAFAEMELEDEBDD | C-0PLK | CA3 |
| EDCNDAFBFBFBEDEBDD | C-0QQQ | CA3 |
| EDCNDAFCFBFBEDEBDD | C-0RQQ | CA3 |
| EDCNDAFEDJFBEDEBDD | C-0T9Q | CA3 |

FIG. 7

LIST UPDATE EMPLOYING NEUTRAL SORT KEYS

This application is a continuation application claiming priority to Ser. No. 11/106,287, filed Apr. 14, 2005 now U.S. Pat. No. 7,293,022.

BACKGROUND OF THE INVENTION

1. Technical Field

The present invention relates to a list updating method and system, and more particularly to a technique for updating a secondary list to match a master list when platforms associated with the master list and the secondary list are different.

2. Related Art

Updating a list A from a list B in an efficient manner requires that the sort order of list A be consistent with the sort order of list B (i.e., the ordering of sort keys associated with list A needs to be consistent with the ordering of sort keys associated with list B). When list A and list B reside on different platforms, the sort orders of list A and list B can be inconsistent. For example, in a platform employing the American Standard Code for Information Interchange (ASCII) character set, digits and upper and lower case alphabetic characters are ordered as 0-9, A-Z, a-z. In contrast, in a platform using the Extended Binary Coded Decimal Interchange Code (EBCDIC) character set, the relative sort order of those same characters is a-z, A-Z, 0-9. Further, the sort order of character strings that include special characters (e.g., +, -, *, etc.) can vary among different software applications irrespective of the underlying character set. For example, if a Lotus Notes database and a DB2 database are both running in a Microsoft Windows environment, Lotus Notes sorts special characters after alphabetic characters, whereas DB2 orders most special characters before alphabetic characters. Sort keys formed from the aforementioned inconsistently sorted characters are, in turn, inconsistently sorted. When such inconsistently sorted sort keys are associated with list A and list B, and list A is being updated from list B, a less efficient update is required. This less efficient update can include the setting of flags and multiple passes through the lists to perform comparisons and modifications associated with the update. Thus, there is a need for an improved technique for updating a list from another list.

SUMMARY OF THE INVENTION

In first embodiments, the present invention provides a method of updating a list in a computing environment, the method comprising:

providing a first list associated with a first platform, the first list comprising a first plurality of data entries, the first plurality of data entries including a first plurality of keys and a second plurality of keys, each data entry of the first plurality of data entries including a key of the first plurality of keys and a key of the second plurality of keys, wherein the first platform is associated with a first set of characters;

providing a second list associated with a second platform, the second list comprising a second plurality of data entries, the second plurality of data entries including a third plurality of keys, each data entry of the second plurality of data entries including a key of the third plurality of keys, wherein the first plurality of data entries matches the second plurality of data entries, wherein the second platform is associated with a second set of characters, wherein the first set of characters and the second set of characters include a first subset of one or more characters, wherein, if the first subset of one or more characters is included in a first set of keys, the first set of keys is sorted differently on the first platform and the second platform, wherein the first set of characters and the second set of characters include a second subset of one or more characters, wherein, if a second set of keys is formed from one or more characters of the second subset, the second set of keys is sorted identically on the first platform and the second platform, wherein the first plurality of keys is formed from one or more characters selected from the first set of characters, and wherein the second plurality of keys and the third plurality of keys are formed from one or more characters of the second subset;

updating the first list, wherein the updating includes at least one of: adding one or more data entries to the first plurality of data entries, deleting one or more data entries from the first plurality of data entries, and modifying one or more data entries of the first plurality of data entries;

sorting the first list on the first platform according to the second plurality of the keys;

sorting the second list on the second platform according to the third plurality of the keys;

comparing the first list to the second list, thereby determining one or more locations in the second list associated with the updating the first list; and updating the second list at the one or more locations, thereby providing a match between the first plurality of data entries and the second plurality of data entries.

In second embodiments, the present invention provides a system for updating a list in a computing environment, the system comprising:

means for providing a first list associated with a first platform, the first list comprising a first plurality of data entries, the first plurality of data entries including a first plurality of keys and a second plurality of keys, each data entry of the first plurality of data entries including a key of the first plurality of keys and a key of the second plurality of keys, wherein the first platform is associated with a first set of characters;

means for providing a second list associated with a second platform, the second list comprising a second plurality of data entries, the second plurality of data entries including a third plurality of keys, each data entry of the second plurality of data entries including a key of the third plurality of keys, wherein the first plurality of data entries matches the second plurality of data entries, wherein the second platform is associated with a second set of characters, wherein the first set of characters and the second set of characters include a first subset of one or more characters, wherein, if the first subset of one or more characters is included in a first set of keys, the first set of keys is sorted differently on the first platform and the second platform, wherein the first set of characters and the second set of characters include a second subset of one or more characters, wherein, if a second set of keys is formed from one or more characters of the second subset, the second set of keys is sorted identically on the first platform and the second platform, wherein the first plurality of keys is formed from one or more characters selected from the first set of characters, and wherein the second plurality of keys and the third plurality of keys are formed from one or more characters of the second subset;

means for updating the first list, wherein the updating includes at least one of: adding one or more data entries to the first plurality of data entries, deleting one or more data entries from the first plurality of data entries, and modifying one or more data entries of the first plurality of data entries;

means for sorting the first list on the first platform according to the second plurality of the keys;

means for sorting the second list on the second platform according to the third plurality of the keys;

means for comparing the first list to the second list, thereby determining one or more locations in the second list associated with the updating the first list; and means for updating the second list at the one or more locations, thereby providing a match between the first plurality of data entries and the second plurality of data entries.

In third embodiments, the present invention provides at least one program storage device readable by a machine, tangibly embodying at least one program of instructions executable by the machine to perform a method of updating a list in a computing environment, the method comprising:

providing a first list associated with a first platform, the first list comprising a first plurality of data entries, the first plurality of data entries including a first plurality of keys and a second plurality of keys, each data entry of the first plurality of data entries including a key of the first plurality of keys and a key of the second plurality of keys, wherein the first platform is associated with a first set of characters;

providing a second list associated with a second platform, the second list comprising a second plurality of data entries, the second plurality of data entries including a third plurality of keys, each data entry of the second plurality of data entries including a key of the third plurality of keys, wherein the first plurality of data entries matches the second plurality of data entries, wherein the second platform is associated with a second set of characters, wherein the first set of characters and the second set of characters include a first subset of one or more characters, wherein, if the first subset of one or more characters is included in a first set of keys, the first set of keys is sorted differently on the first platform and the second platform, wherein the first set of characters and the second set of characters include a second subset of one or more characters, wherein, if a second set of keys is formed from one or more characters of the second subset, the second set of keys is sorted identically on the first platform and the second platform, wherein the first plurality of keys is formed from one or more characters selected from the first set of characters, and wherein the second plurality of keys and the third plurality of keys are formed from one or more characters of the second subset;

updating the first list, wherein the updating includes at least one of: adding one or more data entries to the first plurality of data entries, deleting one or more data entries from the first plurality of data entries, and modifying one or more data entries of the first plurality of data entries;

sorting the first list on the first platform according to the second plurality of the keys;

sorting the second list on the second platform according to the third plurality of the keys;

comparing the first list to the second list, thereby determining one or more locations in the second list associated with the updating the first list; and updating the second list at the one or more locations, thereby providing a match between the first plurality of data entries and the second plurality of data entries.

In fourth embodiments, the present invention provides a method for deploying computing infrastructure, comprising integrating computer-readable code into a computing system, wherein the code in combination with the computing system is capable of performing a process of updating a list in a computing environment, the process comprising:

providing a first list associated with a first platform, the first list comprising a first plurality of data entries, the first plurality of data entries including a first plurality of keys and a second plurality of keys, each data entry of the first plurality of data entries including a key of the first plurality of keys and a key of the second plurality of keys, wherein the first platform is associated with a first set of characters;

providing a second list associated with a second platform, the second list comprising a second plurality of data entries, the second plurality of data entries including a third plurality of keys, each data entry of the second plurality of data entries including a key of the third plurality of keys, wherein the first plurality of data entries matches the second plurality of data entries, wherein the second platform is associated with a second set of characters, wherein the first set of characters and the second set of characters include a first subset of one or more characters, wherein, if the first subset of one or more characters is included in a first set of keys, the first set of keys is sorted differently on the first platform and the second platform, wherein the first set of characters and the second set of characters include a second subset of one or more characters, wherein, if a second set of keys is formed from one or more characters of the second subset, the second set of keys is sorted identically on the first platform and the second platform, wherein the first plurality of keys is formed from one or more characters selected from the first set of characters, and wherein the second plurality of keys and the third plurality of keys are formed from one or more characters of the second subset;

updating the first list, wherein the updating includes at least one of: adding one or more data entries to the first plurality of data entries, deleting one or more data entries from the first plurality of data entries, and modifying one or more data entries of the first plurality of data entries;

sorting the first list on the first platform according to the second plurality of the keys;

sorting the second list on the second platform according to the third plurality of the keys;

comparing the first list to the second list, thereby determining one or more locations in the second list associated with the updating the first list; and updating the second list at the one or more locations, thereby providing a match between the first plurality of data entries and the second plurality of data entries.

The present invention provides a list updating method and system that employs novel sort keys that are sorted into an order that is consistent across different platforms. The neutral keys facilitate updating a secondary list from a master list by providing an update of the secondary list at a location that is consistent, regardless of the platform associated with the list. Advantageously, the present invention requires only a single pass of row-by-row comparisons and updates to provide an updated list.

BRIEF DESCRIPTION OF THE DRAWINGS

FIG. 3 depicts a master list and a secondary list to be updated from the master list by the list update method in FIG. 2, in accordance with embodiments of the present invention.

FIG. 6 depicts the master and secondary lists in FIG. 3 after adding the data entry in FIG. 4B to the master list, and after sorting the master and secondary lists in FIG. 3 on their respective neutral keys, as shown in the process in FIG. 2, in accordance with embodiments of the present invention.

FIG. 7 shows the master and secondary lists in FIG. 6 after updating the secondary list as shown in the process in FIG. 2, in accordance with embodiments of the present invention.

DETAILED DESCRIPTION OF THE INVENTION

Figure 1:
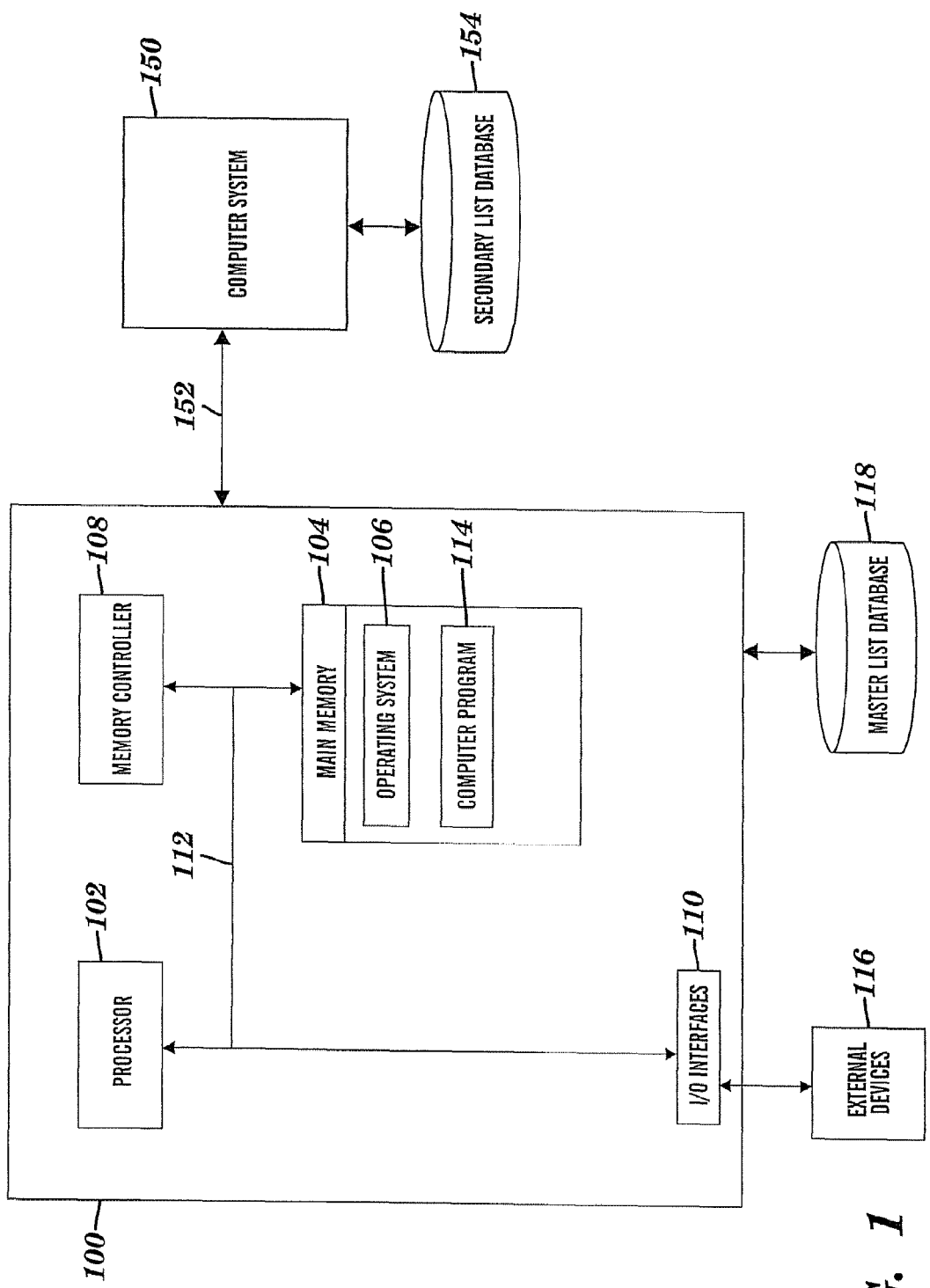
FIG. 1 is a block diagram of a system in accordance with embodiments of the present invention.

FIG. 1 is a block diagram of a system in accordance with embodiments of the present invention. A first computer system 100 in accordance with the present invention is, for example, a mainframe computer. However, those skilled in the art will appreciate that the methods and apparatus of the present invention apply equally to any computer system, regardless of whether the computer system is a complicated multi-user computing apparatus or a single user device such as a personal computer or workstation. First computer system 100 suitably comprises a processor 102, a main memory 104 including an operating system 106, a memory controller 108, and at least one input/output (I/O) interface 110, all of which are interconnected via a system bus 112. Note that various modifications, additions, or deletions may be made to computer system 100 illustrated in FIG. 1 within the scope of the present invention such as the addition of cache memory or other peripheral devices. FIG. 1 is presented to simply illustrate some of the salient features of first computer system 100.

Processor 102 performs computation and control functions of first computer system 100, and comprises a suitable central processing unit. Processor 102 may comprise a single integrated circuit, such as a microprocessor, or may comprise any suitable number of integrated circuit devices and/or circuit boards working in cooperation to accomplish the functions of a processor. Processor 102 suitably executes one or more computer programs 114 within main memory 104.

I/O interfaces 110 may comprise any system for exchanging information from external sources such as external devices 116. External devices 116 may comprise conventional external devices including a CRT, LED screen, keyboard, mouse, printer, facsimile, etc.

It is important to note that while the present invention has been (and will continue to be) described in the context of a fully functional computer system, those skilled in the art will appreciate that the mechanisms of the present invention are capable of being distributed as a program product in a variety of forms, and that the present invention applies equally regardless of the particular type of signal bearing media to actually carry out the distribution. Examples (not shown) of signal bearing media include: recordable type media such as floppy disks and CD-ROMs, and transmission type media such as digital and analog communication links, including wireless communication links.

Memory controller 108, through use of a processor (not shown) separate from processor 102, is responsible for moving requested information from main memory 104 and/or through I/O interfaces 110 to processor 102. While for the purposes of explanation, memory controller 108 is shown as a separate entity, those skilled in the art understand that, in practice, portions of the function provided by memory controller 108 may actually reside in the circuitry associated with processor 102, main memory 104, and/or I/O interfaces 110.

A terminal interface of I/O interfaces 110 allows system administrators and computer programmers to communicate with computer system 100. Although first computer system 100 depicted in FIG. 1 contains only a single main processor 102 and a single system bus 112, it should be understood that the present invention applies equally to computer systems having multiple processors and multiple system buses. Similarly, although the system bus 112 of the preferred embodiment is a typical hardwired, multidrop bus, any connection means that supports bi-directional communication in a computer-related environment could be used.

Stored in main memory 104 is one or more computer programs 114. Such a computer program stored in memory 104 is used in its broadest sense, and includes any and all forms of a computer program, including source code, intermediate code, machine code, and any other representation of a computer program. Computer program 114 provides for updating a list (e.g., secondary list) from another list (e.g., master list) by employing a conversion algorithm that creates sort-neutral sort keys, as described below.

It should be understood that main memory 104 will not necessarily contain all parts of all mechanisms shown. For example, portions of computer program 114 and operating system 106 may be loaded into an instruction cache (not shown) for processor 102 to execute, while other files may well be stored on magnetic or optical disk storage devices (not shown). In addition, although computer program 114 is shown to reside in the same memory location as operating system 106, it is to be understood that main memory 104 may consist of disparate memory locations.

A first database may provide storage for information relative to a first list, and which is necessary to carry out the present invention. As one example, the first database is master list database 118. Master list database 118 exchanges information relative to the master list with first computer system 100. Such information can include, among other things, sort-neutral sort keys and other sort keys (e.g., conventional sort keys) associated with a master list from which a secondary list is updated. As such, master list database 118 may include one or more storage devices, such as a magnetic disk drive or an optical disk drive. In another embodiment, master list database 118 includes data distributed across, for example, a local area network (LAN), wide area network (WAN) or a storage area network (SAN) (not shown).

Second computer system 150 communicates with first computer system 100 via communication link 152. Communication link 152 represents any possible method of communicating with computer systems 100, 150. For example, communication can occur via direct hardwired connection or via an addressable connection (e.g., remotely). Second computer system 150 is, for example, a personal computer or workstation, and can include the components of first computer system 100, as described above.

A second database may provide storage for information relative to a second list, and which is necessary to carry out the present invention. The second database is, for example, secondary list database 154. Secondary list database 154 exchanges secondary list information with second computer system 150. Such information can include, among other things, sort-neutral sort keys and other sort keys (e.g., conventional sort keys) associated with a secondary list to be updated from a master list. Secondary list database 154 may include one or more storage devices and/or distributed data as described above relative to master list database 118.

Thus, the present invention discloses a method for deploying or integrating computing infrastructure, comprising integrating computer-readable code into first computer system 100 and second computer system 150, wherein the code in combination with first computer system 100 and second computer system 150 is capable of performing a process of updating a list.

Figure 2:
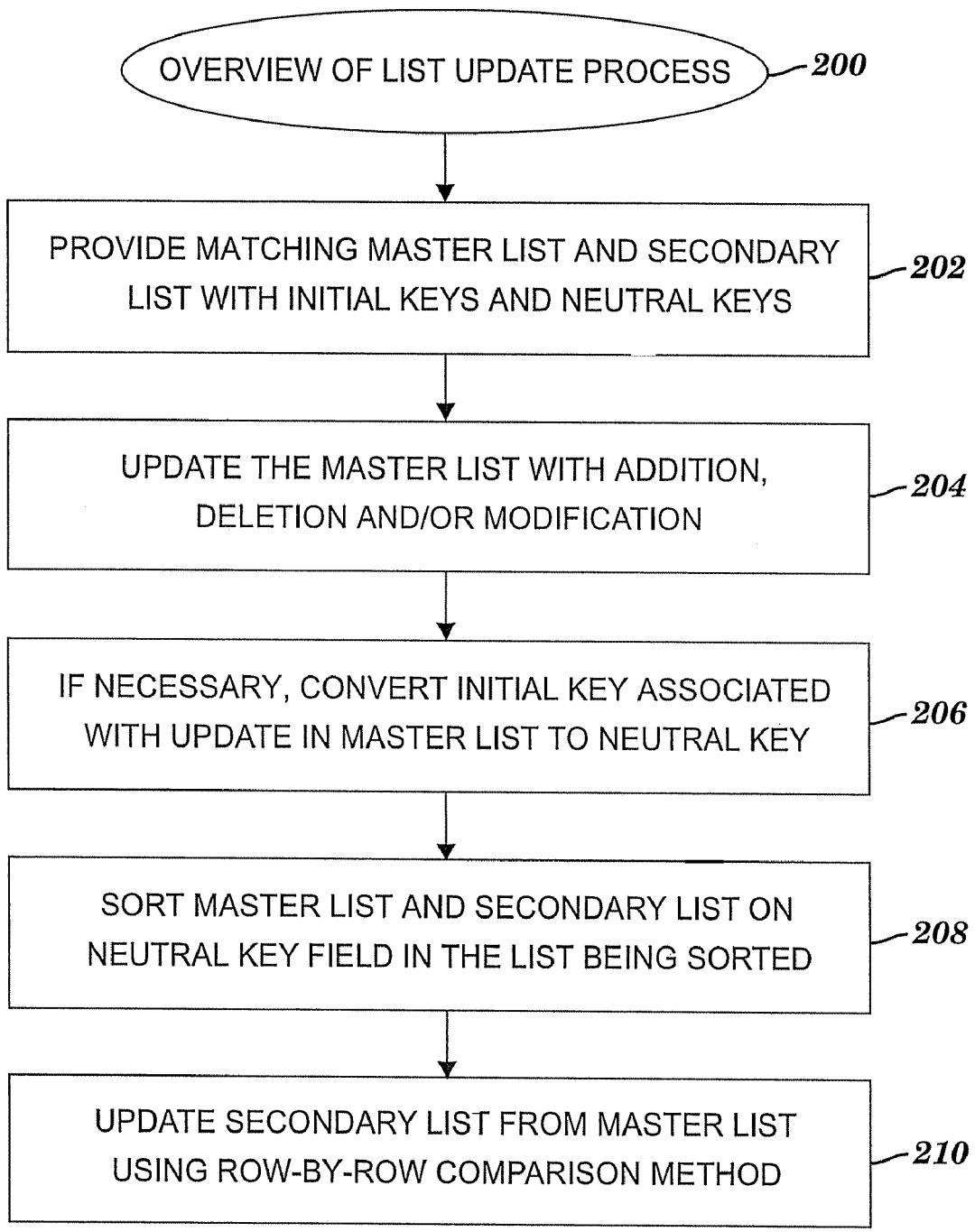
FIG. 2 is a flow chart showing an overview of a list update process that can be implemented in the system in FIG. 1, in accordance with embodiments of the present invention.

FIG. 2 is a flow chart showing an overview of a list update process that can be implemented in the system in FIG. 1, in accordance with embodiments of the present invention. The list update process, which updates a list from another list, begins in step 200. In this example and the examples that follow, the list being updated is the secondary list, and the list from which the secondary list is updated is the master list. A master list, and a secondary list matching the master list are provided in step 202. The master list includes multiple data entries and is associated with a first platform. The secondary list also includes multiple data entries, and is associated with a second platform, which is different from the first platform. The first platform and second platform are comprised of specific software (e.g., Lotus Notes and DB2) or specific combinations of hardware and software (e.g., DB2 running on a personal computer with a Windows operating system and DB2 running on a mainframe computer provided by International Business Machines Corporation of Armonk, N.Y.). These software or hardware/software combinations are associated with managing a list (e.g., sorting a list). The first platform is associated with a first set of characters and the second platform is associated with a second set of characters. Each data entry is comprised of a plurality of data elements. The master list and secondary list are, for example, database tables, each table comprising rows and columns. As one example, each data entry of the master list is a row of the database table. Further, each data element of a row of the database table is stored in one of multiple fields of the row, each field corresponding to a column of the table.

The data entries of the master list include a first plurality of sort keys (a.k.a. initial keys) and a second plurality of sort keys (a.k.a. neutral keys), one of the initial keys and one of the neutral keys being included in each data entry. The data entries of the secondary list include a third plurality of keys, which are also neutral keys. Each data entry of the secondary list includes one of the neutral keys of the third plurality of keys. In one embodiment, the secondary list also includes a set of initial keys so that each data entry of the secondary list includes one of the initial keys of the set. Each data entry of the master list and each data entry of the secondary list also include one or more data elements which are not sort keys (a.k.a. "one or more non-key data elements"). Each non-key data element included in a data entry is associated with a neutral key included in the data entry.

At step 202, the master list matches the secondary list, meaning that the data entries of the master list match the data entries of the secondary list. As used herein, a match between data entries of lists is defined as a one-to-one correspondence between data entries of each list, wherein the neutral keys of the corresponding data entries are identical and the one or more non-key data elements of the corresponding data entries are identical. Further, if the secondary list includes initial keys, then the above definition is supplemented to require that initial keys of the corresponding data entries are also identical.

An initial key of a data entry includes a character string stored in one data element of the data entry or includes a composite character string formed by combining (e.g., by concatenation) character strings included in multiple data elements of the data entry. The character string comprising an initial key is, for instance, one or more characters from the first set of characters associated with the first platform. This first set of characters is, for example, a set of alphanumeric and special characters. As one example, in a database storing employee information where each row of the database corresponds to one employee, a row can include an employee serial number field and a country code field. In this example, the initial key of a row can include a character string formed by concatenating character strings from the employee serial number field and the country code field. The country code indicates, for example, the country associated with the employee, and is necessary to uniquely identify an employee since two employees located in two different countries can be associated with the same employee serial number.

Each neutral key is comprised of a character string stored in a data element of the data entry in which the neutral key is included. A neutral key included in a data entry of the master list is generated by, for example, converting the initial key included in that data entry according to a conversion algorithm, which is described below. The neutral keys included in the secondary list are, for instance, originally generated in the master list by repeating the conversion algorithm described below, and added to the secondary list via additions of data entries to the secondary list. This adding of data entries to the secondary list is part of the list update process described below.

The first platform differs from the second platform relative to how each platform determines the sorting of keys that include certain characters. As used herein, the sorting of keys of a list is equivalent to sorting the list according to its keys. The first set of characters associated with the first platform and the second set of characters associated with the second platform both include at least one subset of one or more characters. If a subset of the at least one subset is included in a set of keys, that set of keys is sorted differently on the first platform and the second platform. In one embodiment, the initial keys are character strings formed from characters selected from the first set of characters or the second set of characters, are capable of including a subset of the aforementioned at least one subset of one or more characters, and thereby are capable of being sorted differently on the first platform and the second platform. In another embodiment, the initial keys include a subset of the at least one subset of one or more characters, as described above, and are sorted differently on the first platform and the second platform.

As one example of the first platform being different from the second platform, the first platform is a personal computer platform and the first set of characters is the ASCII character set. The second platform is a mainframe computer and the second set of characters is the EBCDIC character set. In this example, the subset included in both ASCII and EBCDIC is 0, 7,C, M; the keys to be sorted are C07 and C0M; sorting keys on the first platform uses the hierarchical relationships between characters determined by the binary representations of the ASCII character set; and sorting keys on the second platform uses the hierarchical relationships between characters determined by the binary representations of the EBCDIC character set. Sorting in ascending order on the first platform orders the keys as C07, C0M because the ASCII binary representation of "7" (i.e., 0011 0111) is less than the ASCII binary representation of "M" (i.e., 0100 1101). In contrast, sorting in ascending order on the second platform orders the keys as C0M, C07 because the EBCDIC representation of "7" (i.e., 1111 0111) is greater than the EBCDIC binary representation of "M" (i.e., 1101 0100).

As another example of differing platforms, the first platform includes Lotus Notes as a first computing application associated with the sorting of the master list, and the second platform includes DB2 as a second computing application associated with the sorting of the secondary list. The first and second sets of characters are both ASCII in this example. Lotus Notes imposes a sort index that determines a set of hierarchical relationships between characters of the first set of characters that supplements and/or supersedes the hierarchical relationships between characters of the first set of characters, as determined by the (e.g., ASCII) binary representations of the first set of characters. More particularly, sorting managed by Lotus Notes orders the minus sign "-" (and other special characters) after the letters A-Z, even though the ASCII binary representation of "-" is less than the ASCII binary representation of any of the uppercase letters. Sorting performed by DB2 incorporates the hierarchical relationships between characters as determined by the ASCII binary representations of the second set of characters. In this example, the subset commonly included in the first set of characters and second set of characters is 7, -, A, C; the keys to be sorted are CA7 and C-7; sorting keys on the first platform uses the hierarchical relationships between characters determined by Lotus Notes; and sorting keys on the second platform uses the hierarchical relationships between characters determined by the binary representations of the ASCII character set. Sorting in ascending order on the first platform orders the keys as CA7, C-7 because Lotus Notes orders "-" after "A". In contrast, sorting in ascending order on the second platform orders the keys as C-7, CA7 because DB2 orders "-" before "A". DB2 provides this ordering because the ASCII binary representation of "-" (i.e., 0010 1101) is less that the ASCII binary representation of "A" (i.e., 0100 0001).

The keys described above are only examples of sets of keys being sorted differently on the first platform and the second platform. Other subsets in both the ASCII and EBCDIC character sets can provide additional sets of keys that are sorted differently on the first platform and the second platform, where one of the platforms is ASCII-based and the other is EBCDIC-based. These other exemplary subsets include any subsets that include both letters and digits, or both uppercase and lowercase letters. As described above, ASCII orders digits before letters, while EBCDIC orders letters before digits. Further, uppercase letters are ordered before lowercase letters in ASCII, whereas EBCDIC orders lowercase letters before uppercase letters. Other character sets besides ASCII and EBCDIC can be used as long as there is at least one subset of characters commonly included in each character set such that a set of keys formed from the characters included in one of the commonly included subsets is sorted differently on the first platform and the second platform.

The above-described differences between the first and second platforms relate to the sorting of conventional sort keys. The sorting of neutral keys, however, differs from the sorting of conventional keys. Neutral keys are sorted into an order that is consistent across different platforms. Because of this consistent ordering, these keys are neutral as to the above-described sorting procedures and characteristics of different platforms. That is, these keys are sort-neutral sort keys, which are referred to herein simply as neutral keys. The consistent ordering of sorted neutral keys on different platforms occurs regardless of whether the different platforms have the same or different underlying character sets, and regardless of whether a particular computing application (e.g., Lotus Notes) sorts the neutral keys based on a hierarchical relationship between characters imposed by the computing application.

The sort-neutral characteristics of a neutral key relate to a specific subset of one or more characters commonly included in both the first set of characters associated with the first platform and the second set of characters associated with the second platform. If a set of keys is formed from one or more characters from this specific subset of characters, that set of keys is sorted into an order that is identical on different platforms (e.g., the first platform associated with the master list and the second platform associated with the secondary list). Neutral keys are character strings formed from one or more characters of the specific subset of characters described above.

As one example, the specific subset of one or more characters, as described above, comprises the uppercase letters A through Z, inclusive. The first platform employs the ASCII character set and the second platform employs the EBCDIC character set. The uppercase letters A-Z is a subset of characters commonly included in both the ASCII and the EBCDIC character sets, and keys formed from this subset are sorted consistently on both the first and second platforms. Neutral keys in this example include a subset (a.k.a. "sort-neutral set") of the letters A-Z, such as the first sixteen letters A through P, and no other characters. As used herein, a sort-neutral set is a set of one or more characters included in the aforementioned specific subset of characters, which is commonly included in both the above-described first and second sets of characters, and which has the above-described sort-neutral characteristics. If sort keys are formed from one or more characters included in a sort-neutral set, the keys are neutral keys as described above, and are sorted into an order that is identical on different platforms. For example, if neutral keys to be sorted include ADP and ACP, sorting in ascending order on both the first platform and the second platform provides the identical ordering of ACP, ADP. A conversion algorithm described below ensures that neutral keys include only characters of a sort-neutral set. In other examples, keys can be formed from other subsets of characters (i.e., other sort-neutral sets), such as the sixteen letters a through p, B through Q, or b through q, as long as such keys are sorted into orders that are identical on different platforms.

The master list can include information in data elements in addition to the initial keys and neutral keys. For example, if each data entry corresponds to an employee, data elements of the data entry can include employee information, such as the employee's last name, first name, middle initial and telephone number. The secondary list can include additional data elements that match the above-described data elements (e.g., employee name and telephone number) present in the master list. In one embodiment, the secondary list also includes a plurality of initial keys that uniquely identify the data entries of the secondary list, and which match the initial keys of the master list at step 202.

In step 204, the master list is updated with one or more additions of new data entries, one or more deletions of existing data entries in the master list, and/or one or more modifications of existing data entries in the master list. A modification of a data entry includes, for instance, a change of an employee's telephone number. Adding a new data entry is, for example, adding a new row corresponding to a new employee, wherein the new row includes an initial key and other data elements, but does not initially include a neutral key. After the master list is updated in step 204, there is no longer a match between the data entries of the master list and the data entries of the secondary list. For example, adding data entries to or deleting data entries from the master list can eliminate the one-to-one correspondence between data entries of the master list and data entries of the secondary list. As another example, modifying a non-key data element of a data entry in the master list provides a data entry that is not identical to its corresponding data entry in the secondary list. As described above, if there is no one-to-one correspondence between data entries of the master and secondary lists, or if at least one data element of corresponding data entries of the master and secondary lists are not identical, then the data entries of the master list do not match the data entries of the secondary list.

In step 206, if the master list update in step 202 included an addition of a new data entry, a neutral key is determined and stored in a neutral key field of the new data entry. The neutral key of a data entry is determined by converting the initial key of the data entry. The conversion of the initial key provides a string of characters that are included in the aforementioned subset of characters of the first and second set of characters, wherein keys formed from the subset of characters are sorted identically on different platforms. As one example, the conversion includes determining the hexadecimal form of each character of the initial key of the new data entry (e.g., converting each character to a hexadecimal number that includes two hexadecimal digits), and shifting a base character a number of places corresponding to each character of the hexadecimal form. The base character and the characters resulting after the shifting of the base character are characters in a sort-neutral set of characters, as described above. The sort-neutral set of characters is selected so that keys formed from characters in the sort-neutral set are sorted identically on different platforms. As one example, the sort-neutral set of characters includes the sixteen upper case letters A through P, with the base character being the letter A.

In the example provided above, the conversion of an initial key to a neutral key can employ the following conversion algorithm:

```
public String SortNeutralString(String data)
  { int count;
    String SNstring=" ";
    int this_char;
    // loop through the string data.charAt( ) of length
    // data.length( )
    for(count=0;count<data.length( );count++)
      { this_char=data.charAt(count);
        SNstring=SNstring+(char)('A'+(this_char>>4))+
        (char)('A'+(0x0F&this_char));
      }
    return SNstring;
  }
```

In alternate embodiments, other number systems can be substituted for the hexadecimal forms described above, as long as a sort-neutral set can be determined such that the number of characters in the sort-neutral set is greater than or equal to the base number of the number system. The preferred embodiment uses hexadecimal numbers because function calls exist which use hexadecimal representations, and which facilitate the desired conversion of characters.

In step 208, the list update process continues by sorting the master list via the neutral keys included in the master list, wherein the sort is determined by ordering the data entries in the master list according to the neutral keys included in the master list's data entries. The sorting of the neutral keys in the master list is performed based on the platform associated with the master list, but the resulting sorted order of the master list's neutral keys is the same regardless of the specific platform associated with the master list. Also in step 208, the secondary list is similarly sorted via the neutral keys in the secondary list, wherein the sort is determined by ordering the secondary list's data entries according to the neutral keys included in the secondary list's data entries. The sorting of the neutral keys in the secondary list is performed based on the platform associated with the secondary list, but the resulting sorted order of the secondary list neutral keys is the same regardless of the specific platform associated with the master list.

After both the master list and the secondary lists are sorted according to their respective neutral keys, a conventional comparison technique is employed in step 210, such as a comparison technique that compares two sorted lists of data entries, row by row. Each comparison can determine a location in the sorted secondary list which is associated with a location in the sorted master list related to the updating of the master list in step 204. The location determined in the secondary list is used as the location of the update of the secondary list performed in step 210. The update of the secondary list includes one or more additions of new data entries, one or more deletions of data entries, and/or one or more modifications of data entries so that the data entries of the sorted secondary list match the data entries of the master list. The additions, deletions and/or modifications relative to the secondary list correspond in a one-to-one manner to the above-described updates of the master list in step 204. For example, if the update of the master list in step 204 includes adding a new data entry to the master list, then step 210 includes adding a data entry to the secondary list which matches the new data entry added to the master list.

As a first example illustrating the above-described association between a location in the secondary list and a location in the master list, if the fourth data entry of the sorted master list is updated in step 204, the comparison technique in step 210 determines that the fourth data entry in the sorted secondary list needs to be similarly updated. That is, the ordinal number associated with the location in the secondary list is identical to the ordinal number associated with the location in the master list. A similar relationship between ordinal numbers exists in the following examples. As a second example, if the fourth data entry of the sorted master list is added as a new data entry in step 204, then the comparison technique in step 210 determines that a new data entry needs to be added above the current fourth data entry of the sorted secondary list, thereby making the added data entry the new fourth data entry of the sorted list. As a third example, if a data entry of the master list is deleted in step 204, and the deleted data entry would have been placed as the fourth data entry in the sorted master list in step 208, then the comparison technique in step 210 determines that the fourth data entry of the sorted secondary list needs to be deleted.

One row-by-row comparison and update technique is shown in part in the following pseudo-code, wherein list A (i.e., the secondary list) is updated from list B (i.e., the master list), lists A and B are sorted in ascending order, and the current row of list A and the current row of list B are initialized as the first row of sorted list A and the first row of sorted list B, respectively:

```
if key in current row of list A<key in current row of list B
or last row of list B has been previously compared
    delete current row from list A
    change current row of list A to next row of list A
else if key in current row of list A>key in current row of list B
or last row of list A has been previously compared
    add current row of list B before current row of list A
    change current row of list B to next row of list B
else if key in current row of list A=key in current row of list B
    replace current row of list A with current row of list B
    change current row of list A to next row of list A
    change current row of list B to next row of list B
```

The row-by-row comparison technique repeats the pseudo-code provided above until, for example, the last row of list A is included in a comparison, and the last row of list B is included in a comparison.

Results of the logical operations in the comparison algorithm listed above are determined by, for example, hierarchical relationships between characters of the set of characters associated with the platform associated with the master list or the platform associated with the secondary list. Since the logical operations are applied to neutral keys, the results of these operations are identical on any platform, including the different platforms associated with the master list and the secondary list.

Known variations of the pseudo-code presented above address the cases in which the "change current row" logic would be applied to the last row of a list. Further, in one embodiment, the pseudo-code step "replace current row of list A with current row of list B" replaces only those data elements of the current row of list A that are not identical to the corresponding data elements of the current row of list B.

After step 210, the secondary list update is complete, with one or more additions, one or more deletions and/or one or more modifications having been performed so that the updated secondary list matches the master list. Since the above-described comparison technique is subsequent to the conversion and sorting steps discussed above, the comparison and update of the secondary list can be advantageously completed in a single pass of the master list and a single pass of the secondary list. In a single pass provided by the present invention, the row-by-row comparisons between the two sorted lists start by comparing the first rows of each list. The comparisons proceed along the sequence of rows of each list by incrementing the current row being compared in one or both of the lists, until the last row of each list is included in a comparison. Being a single pass, the row-by-row comparisons do not re-start at a row preceding the current row in the sequence of rows. In contrast, conventional update techniques for updating a list from another list when different platforms are associated with the lists include multiple passes of lists. For example, a conventional technique sets flags to indicate that an update has been made, and multiple flagged updates require multiple passes of a list, wherein each pass searches for a data entry that corresponds to one of the flagged updates.

The update of the secondary list in step 210 may be followed by a replication of the secondary list to several other computing systems (e.g., servers). In one example of a replication (e.g., a Lotus Notes-based replication) of the secondary list to other servers, if the list update process of the present invention is applied to the secondary list, only the changed data of the secondary list is included in the replication process. If the entire secondary list is replaced by the master list (instead of using the present invention), a follow-up replication to other servers considers all of the secondary list changed, and therefore all data in the secondary list is replicated. Thus, if the above-described replication process is to follow a list update, the list update process described herein saves processing time over simply replacing all of one list with another list. Although the above-described characteristics of the replication process are provided by, for instance, features of Lotus Notes, other computing applications provide similar replication features.

List Update Example

FIG. 3 depicts a master list and a secondary list to be updated from the master list by the list update method in FIG. 2, in accordance with embodiments of the present invention. A master list 300 includes multiple rows (i.e., data entries), and each row includes a neutral key field and two other fields (i.e., "Serial No." and "Country Code"), which include data elements that are combined to form initial keys. Each row of master list 300 corresponds to an employee. An employee serial number is stored in the serial number (i.e., Serial No.) field, and a code indicating a country associated with the employee identified by the employee serial number is stored in the country code field. Data entry 302 of master list 300 can also include other data elements (not shown), such as a telephone number and name of an employee associated with the serial number and country code of data entry 302. As one example, a data entry 302 of master list 300 includes a neutral key, DADBDIDFDHDBDGDEDJ, stored in the neutral key field of data entry 302, and an initial key, 018571649, comprised of employee serial number 018571 concatenated with country code 649.

Similarly, a secondary list 310 includes multiple rows of data entries that have been previously inserted and/or updated to match the data entries of master list 300. Each row in secondary list 310 includes data elements in a neutral key field and two other fields (i.e., "Serial No." and "Country Code"), which include data elements that are combined to form initial keys. Similar to master list 300, each row of secondary list 310 corresponds to an employee, with an employee serial number or identification code stored in the Serial No. field and a country code associated with the employee identified by the serial number stored in Country Code. Data entry 312 of secondary list 310 can also include other data elements (not shown) (e.g., telephone number and employee name) that match other data elements (not shown) included in data entry 302 of master list 300. As one example, a data entry 312 of secondary list 310 includes a neutral key, DADBDIDFDHDBDGDEDJ, stored in the neutral key field of data entry 312, and an initial key, 018571649, comprised of employee serial number 018571 concatenated with country code 649. Since the employee serial number and country code of data entry 312 are equal to the employee serial number and country code of data entry 302, these two data entries refer to the same employee. Alternatively, data entries 302 and 312 refer to the same employee because the neutral key of data entry 302 is equal to the neutral key of data entry 312.

Master list 300 and secondary list 310 are provided with initial and neutral keys, and master list 300 matches secondary list 310 as shown in step 202 (see FIG. 2). Master list 300 matches secondary list 310 because the lists' respective data entries correspond in a one-to-one manner, the neutral key of each data entry of master list 300 is equal to the neutral key of the corresponding data entry of secondary list 310, and the initial key of each data entry of master list 300 is equal to the initial key of the corresponding data entry of secondary list 310.

Figure 4A:
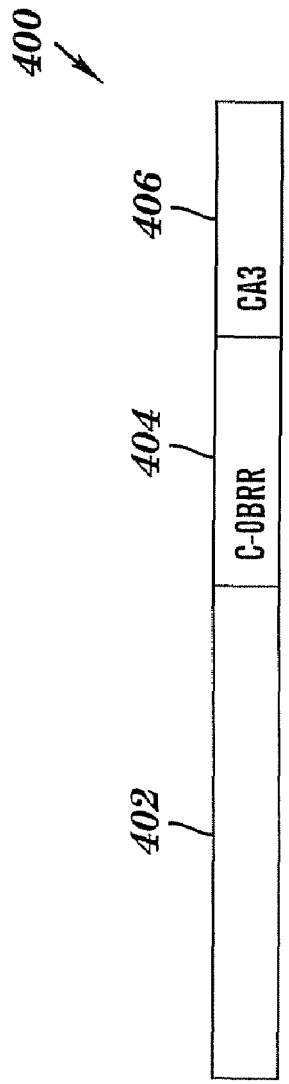
FIG. 4A depicts a data entry to be added to the master list in FIG. 3, in accordance with embodiments of the present invention.

FIG. 4A depicts a data entry to be added to the master list in FIG. 3, in accordance with embodiments of the present invention. Data entry 400 is associated with a new employee to be added to master list 300 (see FIG. 3), as part of an update of the master list in step 204 (see FIG. 2). Data entry 400 is a data entry provided prior to the above-described conversion that generates a neutral key, and as such, initially includes a blank neutral key field 402, along with a serial number 404 and a country code 406 associated with the new employee. The characters in serial number field 404 and country code field 406 can be concatenated to form a nine-character initial key C-0BRRCA3, which uniquely identifies the employee to be added to the master list.

Figure 4B:
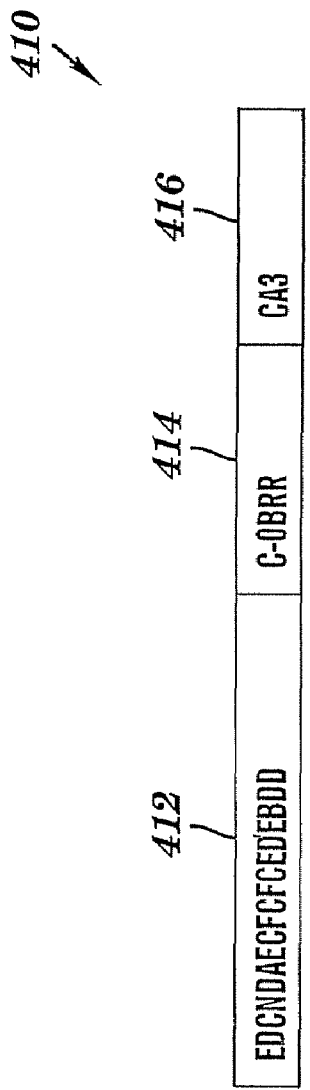
FIG. 4B depicts the data entry in FIG. 4A after a neutral key has been created and stored in the data entry, in accordance with embodiments of the present invention.

FIG. 4B depicts the data entry in FIG. 4A after a neutral key has been created and stored in the data entry, in accordance with embodiments of the present invention. Data entry 410 is a version of data entry 400 (see FIG. 4A) subsequent to the above-described conversion. Data entry 410 includes a neutral key 412 as created by the conversion of the initial key formed by concatenating serial number 414 with country code 416. Serial number 414 and country code 416 are concatenated to form the initial key C-0BRRCA3. After applying the conversion algorithm described above relative to step 206 in FIG. 2, initial key C-0BRRCA3 is converted to neutral key 412, EDCNDAECFCFCEDEBDD, and stored in a neutral key field of data entry 410. The conversion of the initial key of data entry 410 to neutral key 412 is discussed in detail below relative to FIG. 5.

Figure 5:
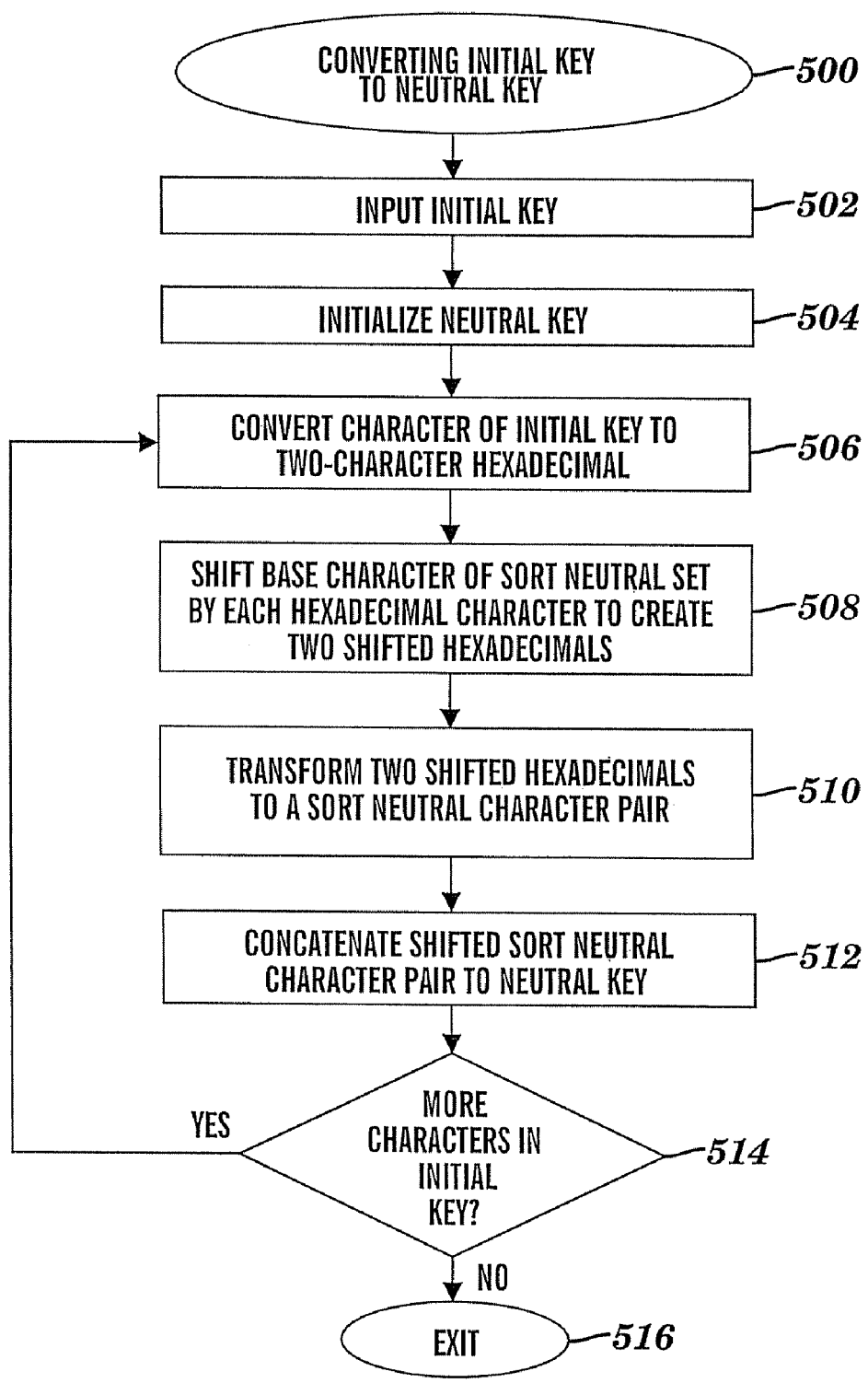
FIG. 5 is a flow chart showing a detailed process of converting an initial key to a neutral key, which is included in the overview process in FIG. 2, in accordance with embodiments of the present invention.

FIG. 5 is a flow chart showing a detailed process of converting an initial key to a neutral key, which is included in the overview process in FIG. 2, in accordance with embodiments of the present invention. Using the example discussed above relative to FIGS. 3, 4A, and 4B, the process of converting initial key C-0BRRCA3 to a resulting neutral key EDCNDAECFCFCEDEBDD begins in step 500. In step 502, initial key C-0BRRCA3 is input as an initial key of a data entry added to the master list. In step 504, the neutral key result is initialized to, for example, an empty string. Starting with a selected character (e.g., the leftmost character, "C") of the initial key, the selected character is converted in step 506 to a string of one or more characters based on a platform-dependent representation of the selected character. For example, the selected character in step 506 is converted to a two-character hexadecimal representation (e.g., a two-digit hexadecimal number) of the selected character based on, for example, the hexadecimal equivalent of the underlying binary representation of the selected character, as determined by the specific platform associated with the master list. If the platform is based on the ASCII character set, the character "C" of the initial key is transformed into a two-character hexadecimal number "43" that corresponds to "C" in the ASCII character set. The hexadecimal number "43" includes two hexadecimal digits "4" and "3".

The conversion of the initial key to the neutral key then employs a selected sort-neutral set of characters. This sort-neutral set is selected so that keys formed from the characters in that set sort identically on different platforms, regardless of the character set employed by the platform associated with the sorting of the keys. One such sort-neutral set is a range of alphabetic characters of the same case, such as the sixteen uppercase letters A through P. In this case, the sort-neutral set is a range of characters; however, other embodiments can include pre-determined gaps between characters of the sort-neutral set.

The selected sort-neutral set includes a base character, such as the character that is ordered first in the sort-neutral set of characters. For instance, "A" is the base character in the sort-neutral range of A through P. In step 508, the base character "A" is shifted twice, once by the first character "4" of the two-character hexadecimal number of step 506, and once by the second character "3" of the two-character hexadecimal number of step 506 (i.e., shifted by each hexadecimal character in the two-character hexadecimal of step 506). Each of these shifts of the base character "A" generates one shifted hexadecimal number. The shifted hexadecimal numbers are transformed and concatenated in step 510 to create a sort-neutral character pair. The transformation of each hexadecimal number in step 510 includes generating a character corresponding to the hexadecimal number, the character being determined by the character set associated with (e.g., underlying) the specific platform associated with the master list.

This shifting of the base character "A" can be implemented by, for example, (1) adding the binary representation of "A" to the extracted upper four bits (i.e., 0100) of the binary representation of the two-character hexadecimal "43" (i.e., 0100 0011) and transforming the result to a hexadecimal character (i.e., the first shifted hexadecimal); and (2) adding the binary representation of "A" to the extracted lower four bits (i.e., 0011) of the binary representation of the hexadecimal "43" (i.e., 0100 0011) and transforming the result to a hexadecimal character (i.e., the second shifted hexadecimal character). Since in each step (1) and (2) the base character is added to one of the four-bit numbers corresponding to 0 through 15, the base character shift is anywhere from 0 to 15 places in the sort-neutral set being applied. Thus, the base character of "A" shifts to a letter in the sixteen-letter sort-neutral range of A through P.

In this example, steps (1) and (2) use ASCII binary representations of "A" and the hexadecimal number "43". Step (1) adds 0100 0001 (i.e., the ASCII binary representation of "A") and 0000 0100 (i.e., the upper four bits extracted from the binary representation of the hexadecimal "43" or 0100 0011) to produce 0100 0101 or "45" in hexadecimal form. The hexadecimal "45" is transformed into its ASCII-equivalent character of "E". That is, the base character "A" is shifted to "E" by using the upper four bits of the hexadecimal "43".

Further, step (2) adds 0100 0001 (i.e., the ASCII binary representation of "A") and 0000 0011 (i.e., the lower four bits extracted from the binary representation of the hexadecimal "43" or 0100 0011) to produce 0100 0100, or "44" in hexadecimal form. The hexadecimal "44" is transformed into its ASCII-equivalent of "D". That is, the base character "A" is shifted to "D" by using the lower four bits of the hexadecimal "43." The transformed results of (1) and (2) are then concatenated to form a character pair (i.e., a sort-neutral character pair) comprising characters from the sort-neutral set. In this case, the sort-neutral character pair formed is "ED", which is the converted form of the first character "C" of the initial key input in step 502.

In step 512, the sort-neutral character pair formed in step 510 is concatenated to the current neutral key to form a new current neutral key. In the initial processing of step 512, the shifted hexadecimal character pair is concatenated to the initialized neutral key (e.g., empty string) formed in step 504. In this example, "ED" is concatenated to the empty string in step 512 to produce a current neutral key of "ED".

Inquiry step 514 determines if there are any remaining characters in the initial key to be converted. If there is at least one remaining non-converted character, the process is repeated starting at step 506. Each time the process is repeated at step 506, the next character in the initial key is converted. The next character is, for example, the character positioned immediately to the right of the character converted in the most recent repetition. For instance, the next character in the initial key input in step 502 is the "minus sign" special character (i.e., "–"). Using steps (1) and (2) again, the "–" character is converted to the "CN" pair, which is concatenated to "ED" in step 512 to form the current neutral key "EDCN". In this example, steps 506, 508, 510, 512 and 514 are repeated for each character in the initial key until neutral key EDCNDAECFCFCEDEBDD is generated in step 512. If inquiry step 514 determines that all characters in the initial key have been converted, the conversion process ends in step 516.

FIG. 6 depicts the master and secondary lists in FIG. 3 after adding the data entry in FIG. 4B to the master list, and after sorting the master and secondary lists in FIG. 3 on their respective neutral keys, as shown in the process in FIG. 2, in accordance with embodiments of the present invention. Following the update of master list 300 (see FIG. 3), in which a new data entry 410 corresponding to a new employee is added in step 204 (see FIG. 2), master list 600 no longer matches secondary list 610. That is, there is no longer a one-to-one correspondence between the rows of master list 600 and secondary list 610, as the master list includes row 410 and the secondary list does not include row 410. Master list 600 is sorted according to the master list's neutral keys (see step 208 in FIG. 2). That is, the master list's data entries are sorted in ascending order according to the neutral keys of the master list. The ordering of the neutral keys of the master list is determined by the platform associated with the master list. Secondary list 610 is similarly sorted in ascending order according to the neutral keys included in the data entries of secondary list 610 (see step 208 in FIG. 2). The ordering of the neutral keys of the secondary list is determined by the platform associated with the secondary list. As discussed above, a set of neutral keys is sorted into an order that is identical on different platforms.

Using a known comparison technique, such as the row-by-row comparison pseudo-code presented and described above relative to step 210 (see FIG. 2), sorted master list 600 and sorted secondary list 610 are compared row-by-row. When this comparison technique compares row 410 of master list 600 with row 612 of secondary list 610, comparison 614 determines that the neutral key in data entry 612 is greater than the neutral key in data entry 410, which indicates that a row needs to be added to the secondary list. The comparison technique updates (see step 210 in FIG. 2) the secondary list by adding row 410 to secondary list 610 above row 612, and updates the current row of master list 600 to the row immediately below row 410.

FIG. 7 shows the master and secondary lists in FIG. 6 after updating the secondary list as shown in the process in FIG. 2, in accordance with embodiments of the present invention. Following the row-by-row comparison method that includes comparison 614 (see FIG. 6), master list 700 remains unchanged from master list 600 (see FIG. 6). Row 410 is inserted into secondary list 610 (see FIG. 6) above row 612 (see FIG. 6) to create updated secondary list 710, thereby providing a match between master list 700 and secondary list 710. The location of the update to secondary list 610 (see FIG. 6) determined by the comparison technique (see step 210 in FIG. 2) corresponds to the location of the update to the master list (see step 204 in FIG. 2). In this example, since row 410 is added as the ninth row of the sorted master list (see FIG. 6), row 410 is added to the sorted secondary list at an ordered location that matches the location at which row 410 was added in the sorted master list. That is, row 410 is added as the new ninth row of secondary list 710.

If the platform associated with the secondary list was changed, the same update example described relative to FIGS. 3-7 provides the same location (e.g., the ninth row) of the update to the sorted secondary list. This location is unchanged because the ordering of the neutral keys remains the same even if the platform determining the order changes. Further, the above-described correspondence of the location of the row added in the sorted master list to the location of the row added to the sorted secondary list (e.g., a ninth row added in both lists) remains the same regardless of the specific platforms associated with the master list and the secondary list, and regardless of whether those specific platforms are the same or different.

The examples described above include providing a master list and a secondary list that already include neutral keys. The present invention also contemplates a master list that initially includes initial keys but no neutral keys. In this case, an empty neutral key column is created in the master list and the conversion technique described above is applied to the initial keys in the master list as if the rows of the master list are newly added rows. This application of the conversion technique generates neutral keys which are stored in the newly formed neutral key column. An initialized (e.g., empty) neutral key column is also added to the secondary list, and the sorting and comparison techniques described above are applied. The neutral key comparisons of the comparison technique copy all the rows of the master list either before or after the rows of the secondary list, and the original rows of the secondary list are deleted. Thus, the comparisons result in the replacement of all the rows of the secondary list with the rows of the master list.

As an alternate embodiment, the roles of the master list and secondary list can be reversed. The update technique described herein can instead include a secondary list that includes initial keys and neutral keys generated from converting the initial keys using the character set associated with the platform related to the secondary list. A master list is provided so that the data entries of the master list match the data entries of the secondary list. Updates analogous to step 204 (see FIG. 2) in this alternate embodiment are performed in the secondary list, and any additions to the secondary list require an application of the conversion algorithm to generate a neutral key. After the two lists are sorted, the master list can be updated from the secondary list using a conventional row-by-row comparison technique.

The present invention can be included, for example, in an article of manufacture (e.g., one or more computer program products) having, for instance, computer usable media. This media has embodied therein, for instance, computer-readable program code means for providing and facilitating the capabilities of the present invention. The article of manufacture can be included as part of the computer system or sold separately.

Additionally, at least one program storage device readable by machine, tangibly embodying at least one program of instructions executable by the machine, to perform the capabilities of the present invention, can be provided.

The flow diagrams depicted herein are provided by way of example. There may be variations to these diagrams or the steps (or operations) described herein without departing from the spirit of the invention. For instance, in certain cases, the steps may be performed in differing order, or steps may be added, deleted or modified. All of these variations are considered a part of the present invention as recited in the appended claims.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method of updating a list in a computing environment, said method comprising:
providing a first list associated with a first platform, said first list comprising a first plurality of data entries, said first plurality of data entries including a first plurality of keys and a second plurality of keys, each data entry of said first plurality of data entries including a key of said first plurality of keys and a key of said second plurality of keys, wherein said first platform is associated with a first set of characters;
providing a second list associated with a second platform, said second list comprising a second plurality of data entries, said second plurality of data entries including a third plurality of keys, each data entry of said second plurality of data entries including a key of said third plurality of keys, wherein said first plurality of data entries matches said second plurality of data entries, wherein said second platform is associated with a second set of characters,
wherein said first set of characters and said second set of characters include a first subset of one or more characters,
wherein, if said first subset of one or more characters is included in a first set of keys, said first set of keys is sorted differently on said first platform and said second platform,
wherein said first set of characters and said second set of characters include a second subset of one or more characters,
wherein, if a second set of keys is formed from one or more characters of said second subset, said second set of keys is sorted identically on said first platform and said second platform,
wherein said first plurality of keys is formed from one or more characters selected from said first set of characters, and
wherein said second plurality of keys and said third plurality of keys are formed from one or more characters of said second subset;
providing a sort-neutral set of n characters included in said second subset of one or more characters;
converting an initial key included in said first plurality of keys to a neutral key to be included in said second plurality of keys, wherein said initial key comprises a first string of one or more characters included in said first set of characters and said neutral key comprises a second string of one or more characters included in said sort-neutral set, wherein said converting said initial key comprises converting a character of said first string to a number represented in a number system having a base b, wherein said number includes a first digit represented in said number system and a second digit represented in said number system, and wherein n is greater than or equal to b;
updating said first list, wherein said updating includes at least one of: adding one or more data entries to said first plurality of data entries, deleting one or more data entries from said first plurality of data entries, and modifying one or more data entries of said first plurality of data entries;
sorting said first list on said first platform according to said second plurality of said keys;
sorting said second list on said second platform according to said third plurality of said keys;
comparing said first list to said second list, thereby determining one or more locations in said second list associated with said updating said first list; and
updating said second list at said one or more locations, thereby providing a match between said first plurality of data entries and said second plurality of data entries.

2. The method of claim 1, wherein said converting said initial key further comprises:
shifting a base character included in said sort-neutral set a first time by said first digit, wherein said shifting said base character said first time includes adding, to form a first sum, a binary representation of said base character to a binary representation of said first digit, and transforming said first sum into a first number represented in said number system;
shifting said base character a second time by said second digit, wherein said shifting said base character said second time includes adding, to form a second sum, said binary representation of said base character to a binary representation of said second digit, and transforming said second sum into a second number represented in said number system; and
transforming said first number into a first sort-neutral character included in said sort-neutral set and transforming said second number into a second sort-neutral character included in said sort-neutral set.

3. The method of claim 2, further comprising:
initializing said second string; and
concatenating said first sort-neutral character and said second sort-neutral character to said second string.

4. The method of claim 2, further comprising providing a set of binary representations of said first set of characters, said set of binary representations being associated with said first platform, wherein said binary representations of said base character, said first digit, and said second digit are included in said set of binary representations.

5. The method of claim 1, further comprising repeating said converting said initial key for each key of said first plurality of keys, wherein a result of said repeating is said second plurality of keys.

6. A method for deploying computing infrastructure, comprising integrating computer-readable code into a computing system, wherein the code in combination with the computing system is capable of performing a process of updating a list in a computing environment, said process comprising:
providing a first list associated with a first platform, said first list comprising a first plurality of data entries, said first plurality of data entries including a first plurality of keys and a second plurality of keys, each data entry of said first plurality of data entries including a key of said first plurality of keys and a key of said second plurality of keys, wherein said first platform is associated with a first set of characters;
providing a second list associated with a second platform, said second list comprising a second plurality of data entries, said second plurality of data entries including a third plurality of keys, each data entry of said second plurality of data entries including a key of said third plurality of keys, wherein said first plurality of data entries matches said second plurality of data entries, wherein said second platform is associated with a second set of characters,
wherein said first set of characters and said second set of characters include a first subset of one or more characters, wherein, if said first subset of one or more characters is included in a first set of keys, said first set of keys is sorted differently on said first platform and said second platform, wherein said first set of characters and said second set of characters include a second subset of one or more characters, wherein, if a second set of keys is formed from one or more characters of said second subset, said second set of keys is sorted identically on said first platform and said second platform, wherein said first plurality of keys is formed from one or more characters selected from said first set of characters, and wherein said second plurality of keys and said third plurality of keys are formed from one or more characters of said second subset;

providing a sort-neutral set of n characters included in said second subset of one or more characters;

converting an initial key included in said first plurality of keys to a neutral key to be included in said second plurality of keys, wherein said initial key comprises a first string of one or more characters included in said first set of characters and said neutral key comprises a second string of one or more characters included in said sort-neutral set, wherein said converting said initial key comprises converting a character of said first string to a number represented in a number system having a base b, wherein said number includes a first digit represented in said number system and a second digit represented in said number system, and wherein n is greater than or equal to b;

updating said first list, wherein said updating includes at least one of: adding one or more data entries to said first plurality of data entries, deleting one or more data entries from said first plurality of data entries, and modifying one or more data entries of said first plurality of data entries;

sorting said first list on said first platform according to said second plurality of said keys;

sorting said second list on said second platform according to said third plurality of said keys;

comparing said first list to said second list, thereby determining one or more locations in said second list associated with said updating said first list; and updating said second list at said one or more locations, thereby providing a match between said first plurality of data entries and said second plurality of data entries.

7. The method of claim 6, wherein said converting said initial key further comprises:

shifting a base character included in said sort-neutral set a first time by said first digit, wherein said shifting said base character said first time includes adding, to form a first sum, a binary representation of said base character to a binary representation of said first digit, and transforming said first sum into a first number represented in said number system;

shifting said base character a second time by said second digit, wherein said shifting said base character said second time includes adding, to form a second sum, said binary representation of said base character to a binary representation of said second digit, and transforming said second sum into a second number represented in said number system; and transforming said first number into a first sort-neutral character included in said sort-neutral set and transforming said second number into a second sort-neutral character included in said sort-neutral set.

8. The method of claim 7, wherein said process further comprises:

initializing said second string; and concatenating said first sort-neutral character and said second sort-neutral character to said second string.

9. The method of claim 7, wherein said process further comprises providing a set of binary representations of said first set of characters, said set of binary representations being associated with said first platform, wherein said binary representations of said base character, said first digit, and said second digit are included in said set of binary representations.

10. The method of claim 6, wherein said process further comprises repeating said converting said initial key for each key of said first plurality of keys, wherein a result of said repeating is said second plurality of keys.

* * * * *